(12) United States Patent
    Suga (10) Patent No.: US 10,868,936 B2
(45) Date of Patent: Dec. 15, 2020

(54) IMAGE READING APPARATUS AND IMAGE FORMING APPARATUS

(71) Applicant: CANON KABUSHIKI KAISHA, Tokyo (JP)

(72) Inventor: Takayuki Suga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/744,031

(22) Filed: Jan. 15, 2020

(65) Prior Publication Data

US 2020/0153993 A1    May 14, 2020

Related U.S. Application Data

(63) Continuation of application No. 16/162,251, filed on Oct. 16, 2018, now Pat. No. 10,574,850, which is a
(Continued)

(30) Foreign Application Priority Data

Mar. 18, 2016 (JP) ................................. 2016-055763
Feb. 6, 2017 (JP) ................................. 2017-019768

(51) Int. Cl.
*H04N 1/028* (2006.01)

(52) U.S. Cl.
CPC . *H04N 1/02855* (2013.01); *H04N 2201/0081* (2013.01); *H04N 2201/0094* (2013.01);
(Continued)

(58) Field of Classification Search
CPC ....... H04N 1/02855; H04N 2201/0081; H04N 2201/0094; H04N 2201/02462; H04N 2201/02472
(Continued)

(56) References Cited

U.S. PATENT DOCUMENTS 8,876,355 B2 * 11/2014 Nomoto ................. G02B 6/002
                                                                  362/625
9,554,011 B2 *  1/2017 Iwamatsu .......... H04N 1/00795
(Continued)

FOREIGN PATENT DOCUMENTS

JP       2004291949 A     10/2004
JP       2011176786 A      9/2011
(Continued)

*Primary Examiner* — Negussie Worku
(74) *Attorney, Agent, or Firm* — Canon U.S.A., Inc. IP Division (57) ABSTRACT

An image reading apparatus includes an illumination unit that illuminates light on an image surface of a sheet, and a photoelectric conversion element that converts reflected light from the sheet illuminated by the illumination unit into an electric signal. The illumination unit includes a circuit board including a light emitting element, and a light guide that guides light, emitted from the light emitting element, to a sheet read surface. In the image reading apparatus, the light guide includes a positioning surface that abuts against a first surface of the circuit board and that performs positioning of the light guide and the circuit board, and a pressing portion that abuts against a second surface of the circuit board on an opposite side of the first surface and that presses the circuit board against the positioning surface.

14 Claims, 8 Drawing Sheets

Related U.S. Application Data continuation of application No. 15/460,754, filed on Mar. 16, 2017, now Pat. No. 10,136,020.

(52) U.S. Cl.
CPC .............. *H04N 2201/02462* (2013.01); *H04N 2201/02472* (2013.01)

(58) Field of Classification Search
USPC ........................................ 358/475, 509, 474
See application file for complete search history.

(56) References Cited

U.S. PATENT DOCUMENTS

| | | | | |
|---|---|---|---|---|
| 10,136,020 B2* | 11/2018 | Suga | ................... | H04N 1/02855 |
| 2006/0279961 A1* | 12/2006 | Sakurai | ................ | G02B 6/0068 |
| | | | | 362/555 |
| 2009/0002607 A1* | 1/2009 | Kubota | ................. | G02F 1/1333 |
| | | | | 349/96 |
| 2012/0182756 A1* | 7/2012 | Chang | ................ | H04N 1/02825 |
| | | | | 362/555 |
| 2013/0278976 A1 | 10/2013 | Murakami | | |
| 2014/0146116 A1* | 5/2014 | Paschkewitz | ........ | B41J 2/17593 |
| | | | | 347/88 |
| 2014/0233077 A1* | 8/2014 | Iwamatsu | .......... | H04N 1/02865 |
| | | | | 358/475 |
| 2015/0156355 A1 | 6/2015 | Murakami | | |
| 2016/0269582 A1* | 9/2016 | Takahashi | .......... | H04N 1/02855 |
| 2018/0146116 A1* | 5/2018 | Yoshida | ............. | H04N 1/02895 |

FOREIGN PATENT DOCUMENTS

| | | |
|---|---|---|
| JP | 2012129974 A | 7/2012 |
| JP | 2013223187 A | 10/2013 |

\* cited by examiner

IMAGE READING APPARATUS AND IMAGE FORMING APPARATUS

CROSS REFERENCE TO RELATED APPLICATIONS

The present application is a continuation of U.S. patent application Ser. No. 16/162,251, filed on Oct. 16, 2018, which is a continuation of U.S. patent application Ser. No. 15/460,754, filed on Mar. 16, 2017, which claims priority from Japanese Patent Application No. 2016-055763 filed Mar. 18, 2016 and Japanese Patent Application No. 2017-019768 filed Feb. 6, 2017, all of which are hereby incorporated by reference herein in their entireties.

BACKGROUND OF THE INVENTION

Field of the Invention

The present disclosure relates to an image reading apparatus that irradiates light on an original document and reads an image, and an image forming apparatus including the image reading apparatus.

Description of the Related Art

A configuration of an image reading apparatus that illuminates an original document is known, in which the image reading apparatus includes a circuit board that includes a plurality of light emitting elements, and a light guide that guides light, towards the original document, that has been output from the light emitting elements. When the light emitting elements are turned on for reading an image, the temperatures of the light emitting elements increase. When the temperatures of the light emitting elements increase, the temperature of the circuit board including the light emitting elements, and the temperature of the light guide disposed in the vicinity of the light emitting elements increases as well. The circuit board and the light guide are formed of different materials, and the linear expansion coefficient of the circuit board and that of the light guide differ. Accordingly, the amount of expansion of the circuit board and that of the light guide differ during increase in temperature such that the light guide, disadvantageously, becomes warped with respect to the circuit board. When the light guide becomes warped with respect to the circuit board, the positional relationship between the light emitting elements and the light guide becomes out of alignment and, as a result, may lead to decrease in light efficiency and change in the illuminance distribution.

The following technique is known that overcomes the above problem. A circuit board is configured as a planar member formed of metal, and surfaces of a light guide and the circuit board facing each other include an adhesive member such that heat of the light emitting elements is diffused by the planar member formed of metal. Warping of the light guide is suppressed in the above manner (Japanese Patent Laid-Open No. 2013-223186).

SUMMARY OF THE INVENTION

An image reading apparatus includes an illumination unit that illuminates light on an image surface of a sheet, and a photoelectric conversion element that converts reflected light from the sheet illuminated by the illumination unit into an electric signal. The illumination unit includes a circuit board including a light emitting element, and a light guide that guides light, emitted from the light emitting element, to a sheet read surface. In the image reading apparatus, the light guide includes a positioning surface that abuts against a first surface of the circuit board and that performs positioning of the light guide and the circuit board, and a pressing portion that abuts against a second surface of the circuit board on an opposite side of the first surface and that presses the circuit board against the positioning surface.

Further features of the present disclosure will become apparent from the following description of exemplary embodiments (with reference to the attached drawings).

DESCRIPTION OF THE EMBODIMENTS

First Exemplary Embodiment

Description will be given with reference to FIGS. 1 to 6B.

Figure 1:
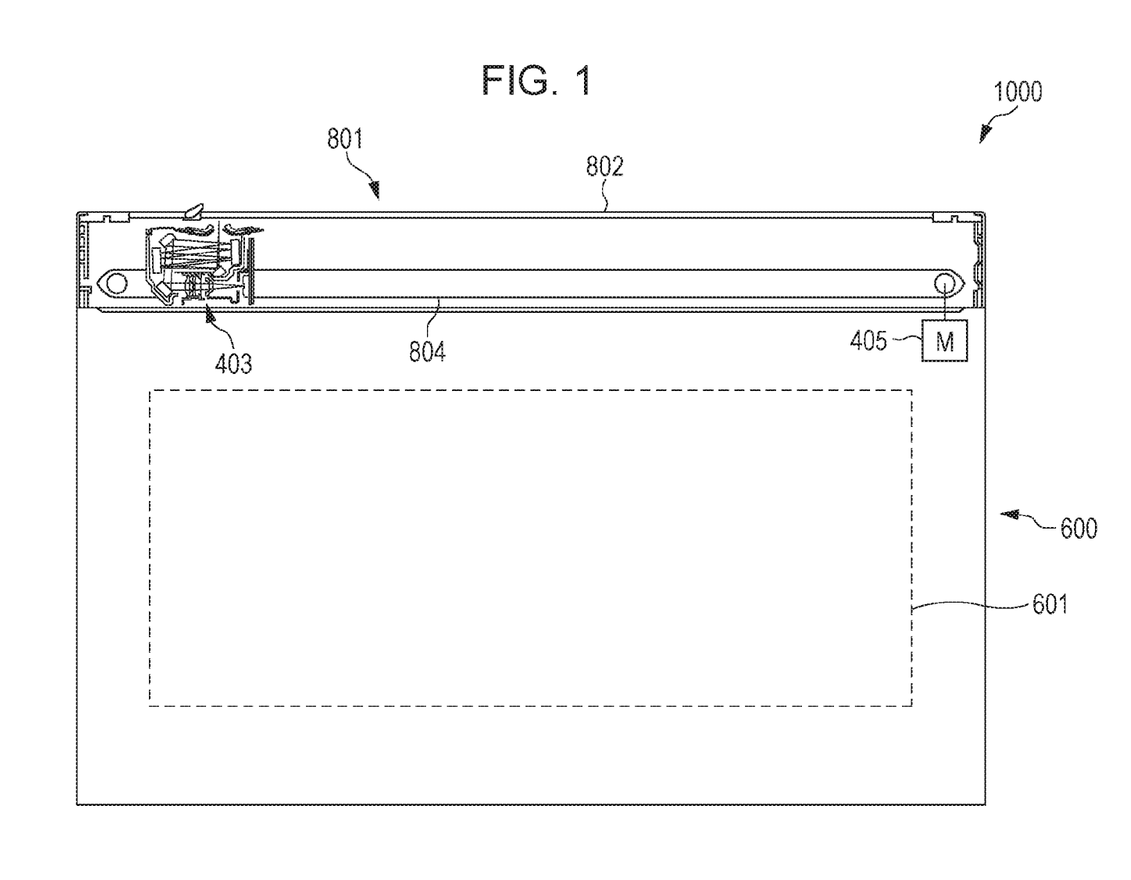
FIG. 1 is a diagram illustrating an image forming apparatus according to a first exemplary embodiment.

As illustrated in FIG. 1, a copying machine 1000 that is an image forming apparatus includes an image reading apparatus 801 and a main body 600 of the image forming apparatus. The image reading apparatus 801 includes a platen glass 802, a reading unit 403, a scan belt 804, and a motor 405. An original document is placed on the platen glass 802. The reading unit 403 reads an image on the original document (a sheet). The scan belt 804 moves and makes the reading unit 403 perform scanning along the platen glass. The motor 405 drives the scan belt. The main body 600 of the image forming apparatus forms images with a known electrophotographic method. The main body 600 of the image forming apparatus includes therein an image forming unit 601. The image forming unit 601 includes a photoconductor, an exposing device, a developing device, a transfer device, and a fixing device. The exposing device forms an electrostatic latent image on the photoconductor according to image data acquired by the image reading apparatus 801. The developing device develops the electrostatic latent image into a developed image with toner. The transfer device transfers the conveyed developed image onto a recording medium, such as a piece of recording paper or a piece of OHP sheet. The fixing device fixes the developed image on the recording medium to the recording medium with heat or the like.

Figure 2:
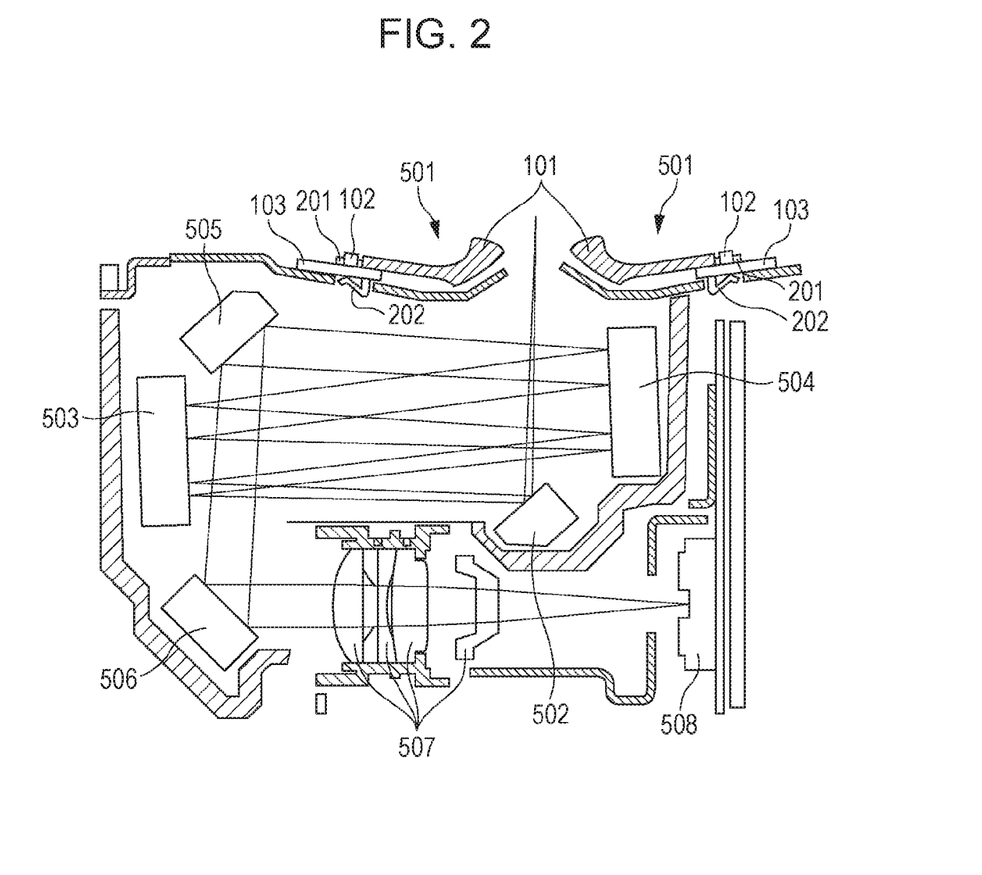
FIG. 2 is a cross-sectional view of a reading unit according to the first exemplary embodiment.

FIG. 2 is an enlarged cross-sectional view of the reading unit 403. The reading unit 403 includes an illumination unit 501, plane mirrors 502, 503, 504, 505, and 506, a lens unit 507, and a photoelectric conversion element 508. The illumination unit 501 irradiates light on an image surface of an original document. The plane mirrors 502 to 506 guides diffused light (reflected light) from the original document to the lens unit 507. The lens unit 507 forms an image on the photoelectric conversion element 508 with the light guided from the plane mirrors 502 to 506. The photoelectric conversion element 508 is a read sensor, such as a CCD. The illumination unit 501 includes light guides 101, a plurality of LEDs (light emitting elements) 102, and circuit boards 103. The light guides 101 each include positioning surfaces 201 that position the corresponding circuit board 103, and a plurality of flexible arms 202 (pressing portions) that press the positioning surfaces 201 towards the corresponding circuit board 103. The circuit boards 103 of the illumination unit 501 are fixed to a frame of the reading unit 403. Details of the illumination unit 501 will be described later. Note that as described later, while the arms 202 include a plurality of arms 202a, 202b, and 202c provided in the longitudinal direction, when there is no need to distinguish each of the arms 202a, 202b, and 202c from each other, description will be given while the arms are referred to the arms 202.

When reading an image on the original document, the original document is placed on the platen glass 802, the LEDs 102 are turned on, and the light is irradiated on the original document. In a state in which the light is irradiated, the scan belt 804 is driven by the motor 405 such that the reading unit 403 performs scanning along the platen glass 802. The light irradiated on the original document is diffused on the surface of the original document, and the diffused light is guided to the lens unit 507 with the plane mirrors 502 to 506 and is formed as an image on the photoelectric conversion element 508. The photoelectric conversion element 508 electrically reads the light formed as an image and generates an electric signal (an image signal) such that the image of the original document can be read.

Figure 3:
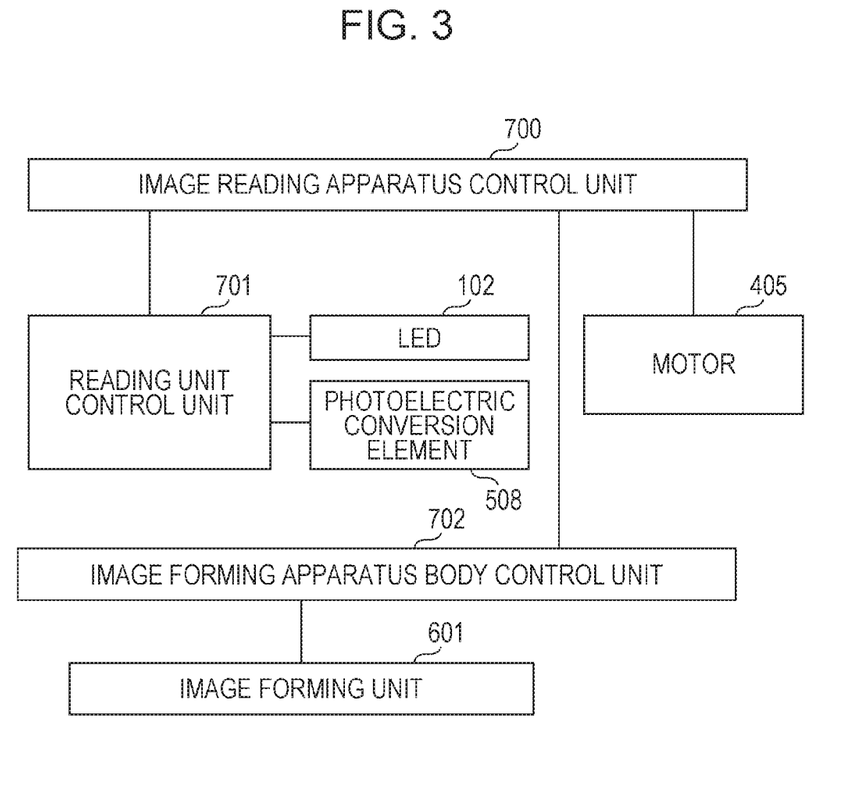
FIG. 3 is a control block diagram of the image forming apparatus according to the first exemplary embodiment.

FIG. 3 illustrates a control block diagram of the copying machine 1000. An image reading apparatus control unit 700 controls a reading unit control unit 701 and the motor 405. The reading unit control unit 701 controls the LEDs 102 and the photoelectric conversion element 508. An image forming apparatus body control unit 702 controls the image forming unit 601. The reading unit control unit 701 transmits the image signal generated by the photoelectric conversion element 508 to the image reading apparatus control unit 700. The image reading apparatus control unit 700 transmits the image signal to the image forming apparatus body control unit 702, and the image forming apparatus body control unit 702 controls the image forming unit 601 on the basis of the image signal and forms an image on a recording medium.

Configuration of Illumination Unit

Referring to FIGS. 4 to 6B, details of the illumination unit 501 will be described.

Figure 4:
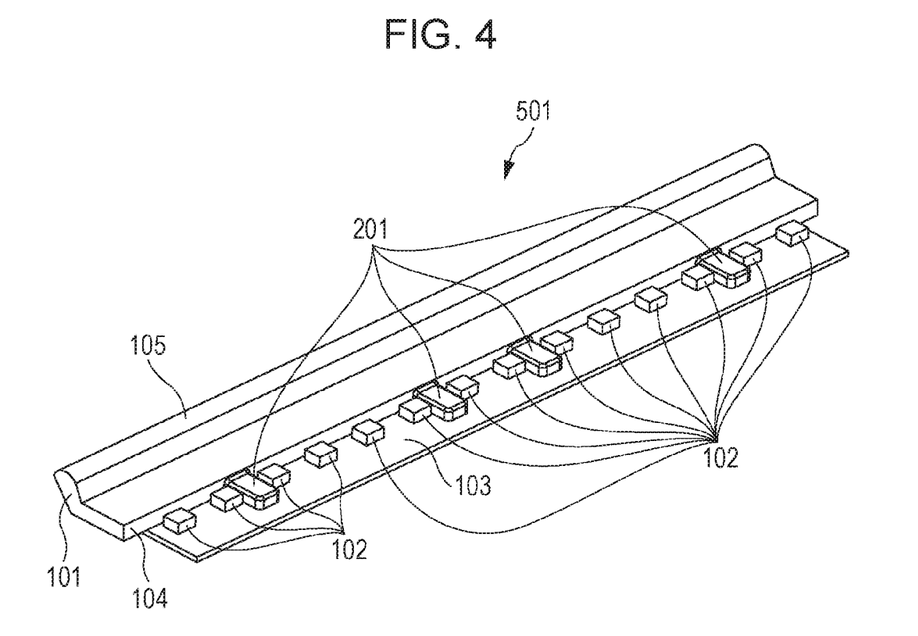
FIG. 4 is a schematic block diagram of an illumination unit according to the first exemplary embodiment.

FIG. 4 is a perspective view illustrating a schematic configuration of the illumination unit 501. As illustrated in FIG. 4, the illumination unit 501 includes the light guide 101, the LEDs 102, and the circuit boards 103. The LEDs 102 are disposed in a row in the longitudinal direction of the circuit board 103. The light guide 101 includes an incident surface 104 on which the light from the LEDs 102 is incident, and an emission surface 105 that emits light guided by light guide 101 and that irradiates light on the original document read by the image reading apparatus.

Figure 5A:
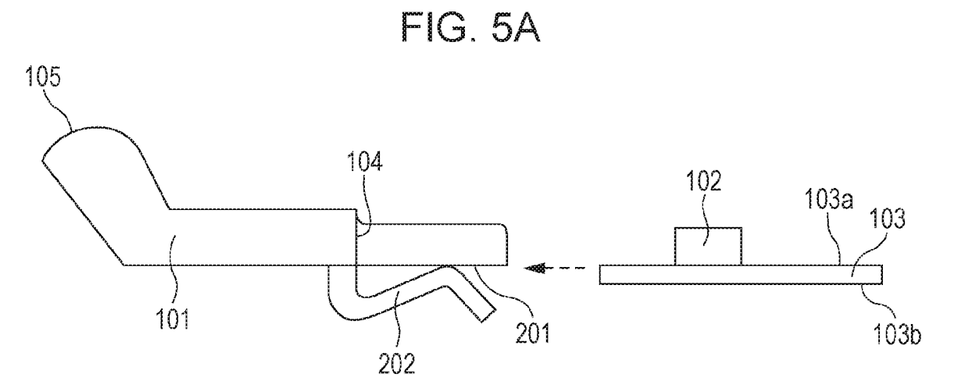
FIG. 5A is a side view illustrating a state before the circuit board is attached to the light guide according to the first exemplary embodiment.
Figure 5B:
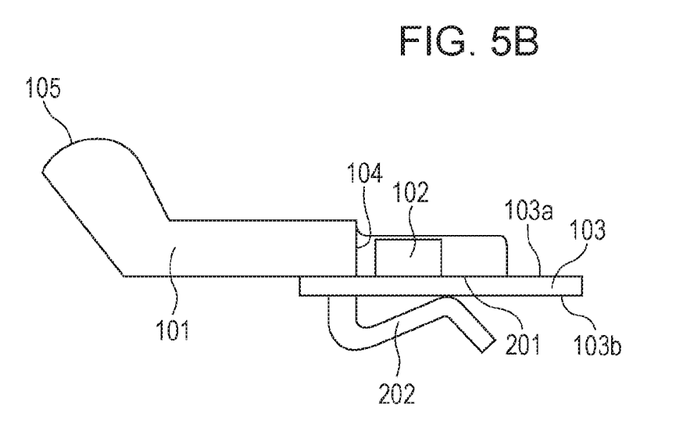
FIG. 5B is a side view illustrating a state after the circuit board has been attached to the light guide according to the first exemplary embodiment.

FIGS. 5A and 5B are side views of the illumination unit 501 described while referring to FIG. 4. FIG. 5A illustrates a state before the circuit board 103 is attached to the light guide 101, and FIG. 5B illustrates a state after the circuit board 103 has been attached to the light guide 101.

The positioning surface 201 is provided so as to extend from the light guide 101. The positioning surface 201 abuts against an LED mount surface 103a (a first surface) of the circuit boards 103 so as to position the circuit board 103 with respect to the light guide 101. The arms 202 are provided in a flexible manner on the undersurface of the light guide 101, and press the undersurface (a second surface that is on the opposite side of the first surface) of the circuit board 103 towards the positioning surface 201. The positioning surfaces 201 and the arms 202 are provided in plural numbers across the longitudinal direction of the light guide 101 and the circuit board 103. The arms 202 perform pressing at positions between adjacent LEDs 102 on the circuit board 103 and in the longitudinal direction of the circuit board 103. The positioning surfaces 201 are flat surfaces that are substantially parallel to the circuit board 103 and abut against the circuit board 103. The area in which the positioning surfaces 201 abut against the circuit board 103 is larger than the area in which the arms 202 abut against the circuit board 103; accordingly, positioning can be performed in a stable manner.

Figure 6A:
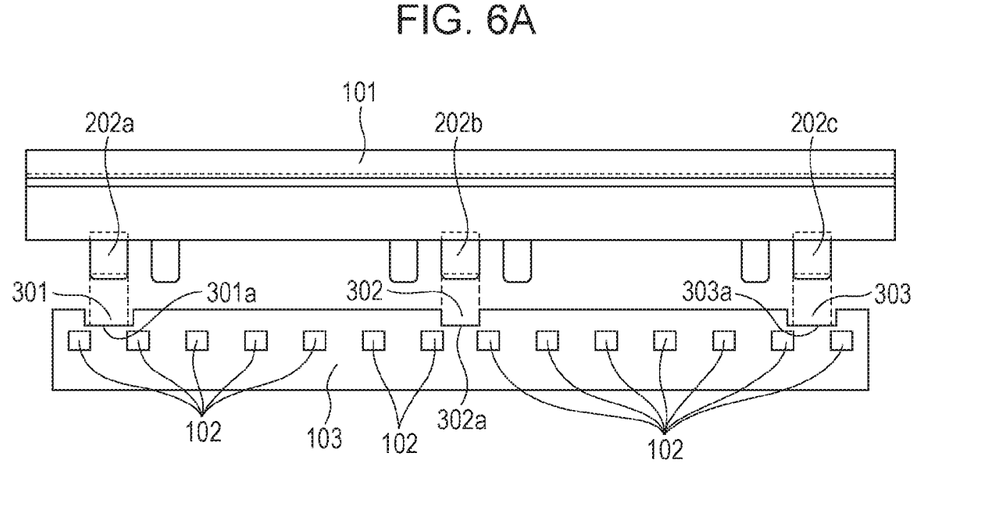
FIG. 6A is a top view illustrating a state before the circuit board is attached to the light guide according to the first exemplary embodiment.
Figure 6B:
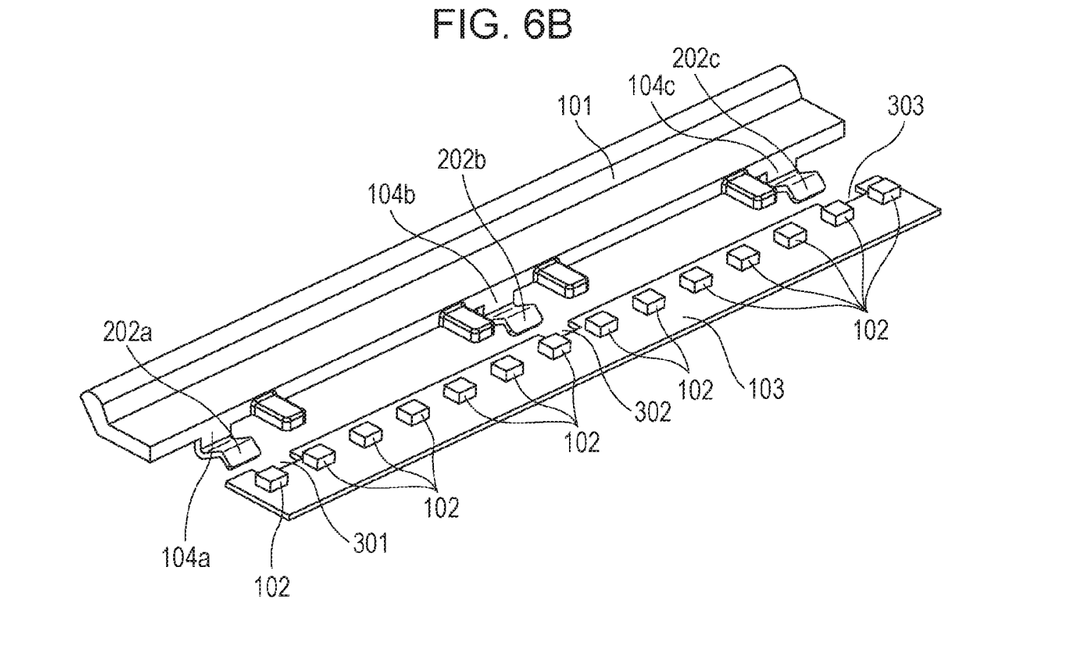
FIG. 6B is a perspective view illustrating a state before the circuit board is attached to the light guide according to the first exemplary embodiment.

FIG. 6A is a plan view of the illumination unit 501 before the light guide 101 and the circuit board 103 are connected to each other, and FIG. 6B is a perspective view of the above illumination unit 501. As illustrated in FIGS. 6A and 6B, the circuit board 103 includes cut-outs 301, 302, and 303. The cut-outs 301, 302, and 303 are provided in the longitudinal direction so as to correspond to the arms 202a, 202b, and 202c, respectively. The cut-out 302 (the center cut-out) is provided at substantially the center in the longitudinal direction of the circuit board 103. The cut-outs 301 and 303 (the cut-outs at the end portions) are provided on the end portion sides in the longitudinal direction with respect to the cut-out 302. The arm 202b (a center pressing portion) is provided at substantially the center in the longitudinal direction of the light guide 101. The arms 202a and 202c (pressing portions at the end portions) are provided on the end portion sides in the longitudinal direction with respect to the arm 202b. A gap between the center cut-out 302 and the arm 202b at the center is smaller than the gap between each cut-out 301 (303) and the corresponding arm 202a (202c) at each end. The center cut-out 302 has a width that fits the arm 202b at the center thereof with a slight gap, and the cut-outs 301 and 303 at both ends have widths that fit the arms 202a and 202c therein with large gaps.

A case in which the circuit board 103 is attached to the light guide 101 will be described. From a state in FIG. 5A, the circuit board 103 is pressed against and inserted into the light guide 101. In so doing, although the arms 202 hit against the circuit board 103, since the arms 202 are flexible, the circuit boards 103 can enter the light guide 101. The flexed arms 202 press the undersurface of the circuit board 103 towards the positioning surface 201. In the course of inserting the circuit board 103, the arm 202b enters the cut-out 302 at the center of the circuit board. Since the arm 202b and the center cut-out 302 have dimensions allowing the arm 202b and the cut-out 302 to fit to each other with a slight gap, the positions of the light guide 101 and the circuit board 103 in the longitudinal direction is determined. When the circuit board 103 is made to move further into the light guide 101, surfaces 301a, 302a, and 303a on the inside of the cut-outs 301, 302, and 303 come in contact with the abutment surfaces 104a, 104b, and 104c of the light guide 101. Subsequently, the position of the circuit board 103 in the insertion direction is determined. Since positioning and fixing can be performed in the above manner without using an adhesive, a process of maintaining the positions until a predetermined strength is created in the adhesive is not needed. In conventional cases in which the circuit board and the light guide are adhered to each other with an adhesive, time is needed from when the circuit board and the light guide is adhered until a predetermined adhesive power is created. Accordingly, in a case in which either of the circuit board and the light guide has a warp, a certain amount of time of applying pressure is needed after the adhesion, or else, the interface of adhesion may become peeled off; accordingly, efficiency in assembling work is poor. The present exemplary embodiment is capable of improving the efficiency in assembling work.

Typically, the light guide 101 is formed of transparent resin. Meanwhile, since the circuit board 103 releases heat generated by the LEDs 102, the circuit board 103 is formed of metal, such as aluminum. The linear expansion coefficient of the light guide 101 is larger than that of the circuit board 103. When the LEDs 102 are kept on continuously, the temperatures of the light guide 101 and the circuit board 103 increase and the light guide 101 and the circuit board 103 expand with heat. In such a case, the resin light guide 101 expands more than the metal circuit board 103. As illustrated in FIG. 6A, the position of the light guide 101 in the longitudinal direction with respect to the circuit board 103 is determined by the state in which the arm 202b provided at the center and the cut-out 302 are fitted to each other. Meanwhile, the arms 202a and 202c at the end portions and the cut-outs 301 and 303 have larger gaps between each other than the gap between the arm 202b and the cut-out 302. Accordingly, even if the light guide 101 and the circuit board 103 were to expand with heat due to the heat generated by the LEDs 102, the light guide 101, with respect to the circuit board 103, thermally expands towards the two end portions when the center portion is the reference point. Although the circuit board 103 is in contact with the positioning surfaces 201 of the light guide 101 and the arms 202, since the circuit board 103 is not fixed, the circuit board 103 is capable of sliding and expanding by the amount of difference in the thermal expansion. With the above, a warp is prevented from occurring in the light guide 101 or the circuit board 103 caused by the difference in the amount of thermal expansion; accordingly, misalignment in the relative positions between the LEDs 102 and the light guide 101 and a decrease in the amount of light can be prevented from occurring.

Second Exemplary Embodiment

Other than the difference in the method of fixing the circuit board 103 and the light guide 101 to each other, a second exemplary embodiment has a similar configuration as that of the first exemplary embodiment. Accordingly, components that are similar to the first exemplary embodiment are attached with the same reference numerals and description thereof is omitted.

Figure 7A:
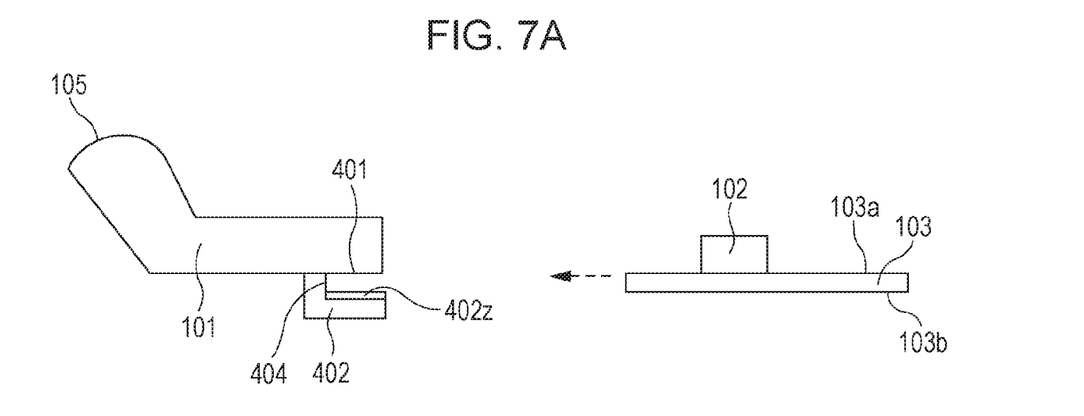
FIG. 7A is a side view illustrating a state before the circuit board is attached to the light guide according to a second exemplary embodiment.
Figure 7B:
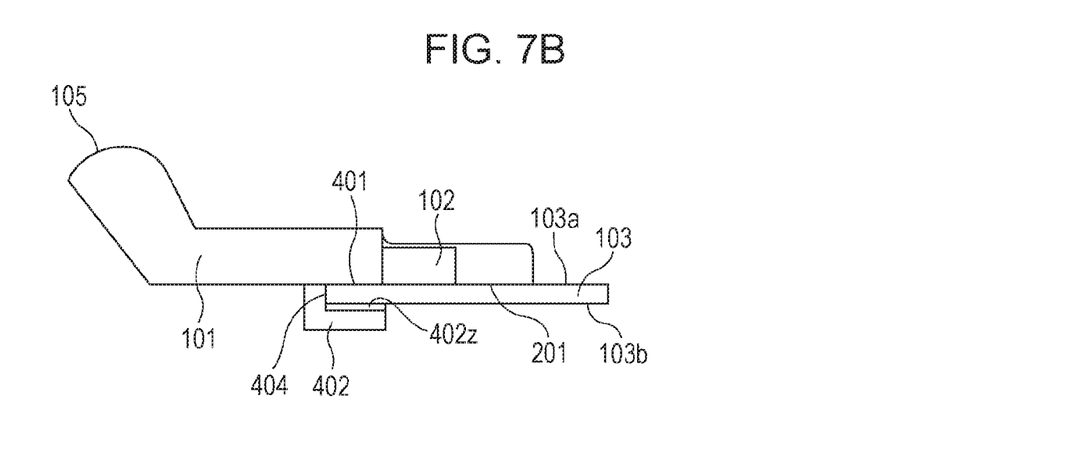
FIG. 7B is a side view illustrating a state after the circuit board has been attached to the light guide according to the second exemplary embodiment.

FIGS. 7A and 7B are side views of the illumination unit 501. FIG. 7A illustrates a state before the circuit board 103 is attached to the light guide 101, and FIG. 7B illustrates a state after the circuit board 103 has been attached to the light guide 101.

A positioning surface 401 is provided on the undersurface of the light guide 101. The positioning surface 401 abuts against the LED mount surface 103a (a first surface) of the circuit board 103 so as to position the circuit board 103 with respect to the light guide 101. Arms 402 including the projections 402z are provided in a flexible manner on the undersurface of the light guide 101. Note that as described later, while the arms 402 include a plurality of arms 402a, 402b, and 402c provided in the longitudinal direction, when there is no need to distinguish each of the arms 402a, 402b, and 402c from each other, description will be given while the arms are referred to the arms 402. The projections 402z press the undersurface (a second surface that is on the opposite side of the first surface) of the circuit board 103 towards the positioning surfaces 401. The positioning surfaces 401 and the projections 402z are provided in plural numbers across the longitudinal direction of the light guide 101 and the circuit board 103. The arms 402 perform pressing at positions between adjacent LEDs 102 on the circuit board 103 and in the longitudinal direction of the circuit board 103. The positioning surfaces 401 are flat surfaces that are substantially parallel to the circuit board 103 and abut against the circuit board 103. The area in which the positioning surfaces 401 abut against the circuit board 103 is larger than the area in which the projections 402z abut against the circuit board 103; accordingly, positioning can be performed in a stable manner.

Figure 8A:
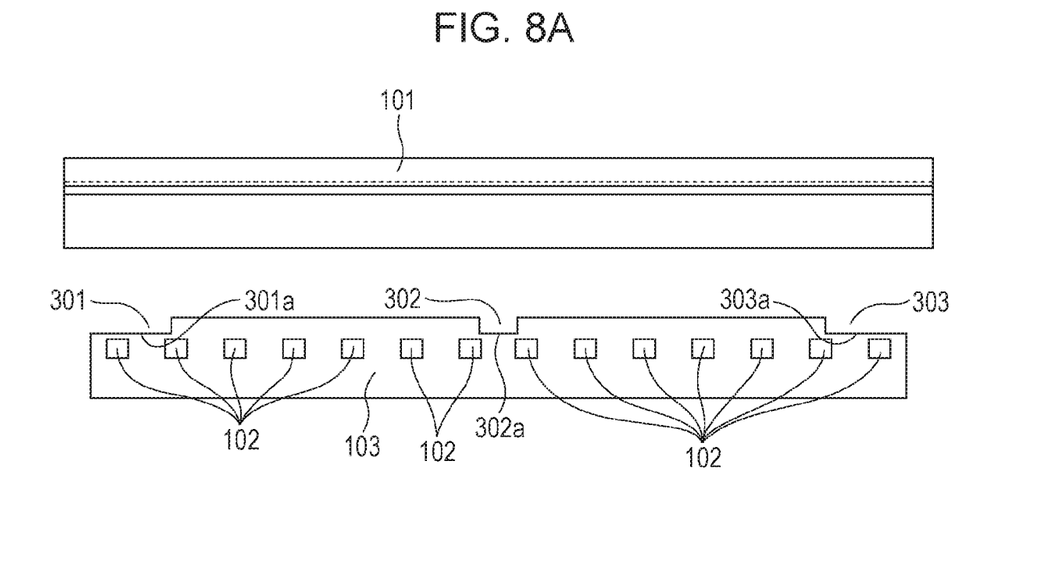
FIG. 8A is a top view illustrating a state before the circuit board is attached to the light guide according to the second exemplary embodiment.
Figure 8B:
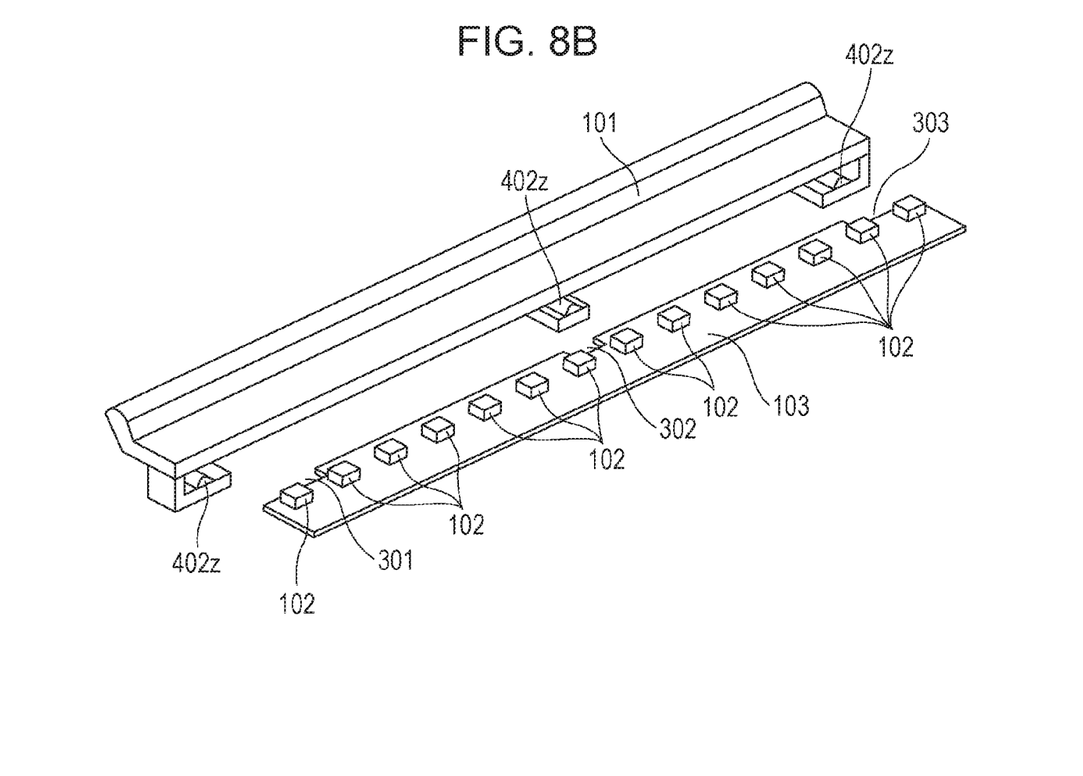
FIG. 8B is a perspective view illustrating a state before the circuit board is attached to the light guide according to the second exemplary embodiment.

FIG. 8A is a plan view of the illumination unit 501 before the light guide 101 and the circuit board 103 are connected to each other, and FIG. 8B is a perspective view of the above illumination unit 501.

As illustrated in FIGS. 8A and 8B, the circuit board 103 includes cut-outs 301, 302, and 303. The cut-outs 301, 302, and 303 are provided in the longitudinal direction so as to correspond to the arms 402a, 402b, and 402c, respectively. The cut-out 302 (the center cut-out) is provided at substantially the center in the longitudinal direction of the circuit board 103. The cut-outs 301 and 303 (the cut-outs at the end portions) are provided on the end portion sides in the longitudinal direction with respect to the cut-out 302. The projection 402z of the arm 402b (a center pressing portion) is provided at substantially the center in the longitudinal direction of the light guide 101. The projections 402z of the arms 402a and 402c (pressing portions at the end portions) are provided on the end portion sides in the longitudinal direction with respect to the arm 402b.

A case in which the circuit board 103 is attached to the light guide 101 will be described. From a state in FIG. 7A, the circuit board 103 is pressed against and inserted into the light guide 101. In so doing, although the projections 402z of the arms 402 hit against the circuit board 103, since the arms 402 are flexible, the circuit boards 103 can enter the light guide 101. The flexed arms 402 press the undersurface of the circuit board 103 towards the positioning surface 401. In the course of inserting the circuit board 103, the arm 402 enters the cut-out 302 at the center of the circuit board. Since the arm 402 and the center cut-out 302 have dimensions allowing the arm 402 and the cut-out 302 to fit to each other with a slight gap, the positions of the light guide 101 and the circuit board 103 in the longitudinal direction is determined.

When the circuit board 103 is made to move further into the light guide 101, surfaces 301a, 302a, and 303a on the inside of the cut-outs 301, 302, and 303 come in contact with abutment surfaces 404 of the light guide 101 (see FIGS. 7B and 8A). Subsequently, the position of the circuit board 103 in the insertion direction is determined. Since positioning and fixing can be performed in the above manner without using an adhesive, an advantageous effect similar to that of the first exemplary embodiment can be obtained.

Modifications

The exemplary embodiments described above can be applied with the following modifications.

As illustrated FIG. 5A, a configuration in which the positioning surface 201 of the light guide 101 abuts against the LED mount surface 103a of the circuit board 103 has been described; however, the configuration is not limited to the above. The advantageous effect of preventing a warp caused by expansion with heat at a time of temperature increase can be obtained with a configuration in which an LED non-mounting surface 103b and the positioning surface 201 abut against each other and in which the flexible arms 202 press the LED mount surface 103a. However, the configuration may work against the accuracy in the relative position between the incident surface 104 of the light guide 101 and the LEDs 102 by the amount of dimensional tolerance in the thickness of the circuit board 103; accordingly, the positioning is, desirably, performed on the LED mount surface 103a side of the circuit board 103.

A configuration in which the positioning in the longitudinal direction is performed by fitting the arm 202b provided at the center portion of the light guide 101 and the cut-out 302 provided in the circuit board to each other has been described; however, the configuration is not limited to the above. The advantageous effect of the present disclosure can be obtained by a configuration in which the positioning in the longitudinal direction is performed with the arm 202a (or 202c) at the end portion and the cut-out 301 (or 303). However, since the difference in the amount in which the circuit board 103 expands with heat and the amount in which the light guide 101 expands with heat can be made smaller as the distance between the positioning portion, which is the reference point of the thermal expansion, and the end portion becomes shorter. Accordingly, in order to reduce the relative misalignment between the light guide 101 and the LEDs 102, a configuration in which the positioning is performed at the center portion is preferable.

A configuration in which metal is used as the material of the circuit board 103 in order to release the heat generated by the LEDs 102 has been described; however, the configuration is not limited to the above. A material other than metal, such as a resin material including glass epoxy used in typical electric boards, for example, may be used for the circuit board 103. In such a case, the difference in the linear expansion coefficient between the light guide 101 formed of transparent resin and the circuit board 103 is smaller than in a case in which metal is used as the circuit board. However, since the difference in the amount of thermal expansion between the light guide 101 and the circuit board 103 is created, the present disclosure is advantageous in preventing a warp from being created during increase in temperature.

A configuration in which the positioning surfaces 201 and the arms 202 are disposed alternately in the longitudinal direction (a configuration in which there is no overlap) has been described; however, the configuration is not limited to the above. The reason for alternately disposing the positioning surfaces 201 and the arms 202 is, since the light guide 101 is typically formed of resin, to simplify the configuration of the mold used in injection molding. In attaching the light guide 101 and the circuit board 103 to each other, the positioning surfaces 201 and the arms 202 may be opposed to each other. A configuration in which the original document is placed on the platen glass 802 and reading is performed by having the reading unit 403 perform scanning has been described; however, the configuration is not limited to the above. The present disclosure is valid in a configuration in which the reading unit 403 is static and in which reading is performed by relatively moving the original document with an automatic document conveying device.

While the description has been made with the copying machine 1000 adopting an electrophotographic method, the configuration is not limited to the above. The image reading apparatus of the present exemplary embodiment may be used in a printer and the like that adopt an ink jet method that forms an image on a sheet by ejecting ink thereon. Furthermore, the present disclosure can be used in an image reading apparatus, such as a scanner, that does not form an image on a recording medium.

While the present disclosure has been described with reference to exemplary embodiments, it is to be understood that the disclosure is not limited to the exemplary embodiments. The scope of the following claims is to be accorded the broadest interpretation so as to encompass all such modifications and equivalent structures and functions.

What is claimed is:

1. An image reading apparatus comprising:
    a plurality of light emitting elements configured to emit light;
    a circuit board including a first circuit surface on which the plurality of light emitting elements is arranged in a first direction and a first recessed portion recessed in a second direction intersecting with the first direction in parallel with the first circuit surface;
    a light guide configured to guide light, emitted from the plurality of light emitting elements, to a sheet; and
    an image reading device configured to read an image on the sheet based on light reflected from the sheet,
    wherein the light guide includes a first surface facing the first circuit surface, and a positioning portion provided at a position corresponding to the first recessed portion in the first direction and extending from the first surface in a third direction intersecting with the first direction and the second direction and configured to position the circuit board in the first direction with respect to the light guide member in a state in which the positioning portion enters the first recessed portion, and
    wherein the light guide includes a second surface facing a second circuit surface of the circuit board opposite to the first circuit surface, and the second surface extends from the positioning portion in the second direction.

2. The image reading apparatus according to claim 1, wherein, in the first direction, a position of the center of the circuit board is included in an area where the first recessed portion is provided.

3. The image reading apparatus according to claim 1, wherein the circuit board further includes a second recessed portion recessed in the second direction and a third recessed portion recessed in the second direction,
    wherein the light guide has a first portion and a second portion, the first portion extending from the first surface in the third direction and entering the second recessed portion, the second portion extending from the first surface in the third direction and entering the third recessed portion, wherein the light guide has a third surface and a fourth surface, the third surface extending from the first portion in the second direction and facing the second circuit surface, the fourth surface extending from the second portion in the second direction and facing the second circuit surface, and wherein, in the first direction, a position of the center of the circuit board is between the second recessed portion and the third recessed portion.

4. The image reading apparatus according to claim 3, wherein, in the first direction, a distance between the position of the center of the circuit board and the second recessed portion is equal to a distance between the position of the center of the circuit board and the third recessed portion.

5. The image reading apparatus according to claim 3, wherein each of the second surface, the third surface and the fourth surface includes a pressing portion configured to abut against the second circuit surface and to press the circuit board so that the first circuit surface is pressed against the first surface.

6. The image reading apparatus according to claim 3, wherein a difference between a width of the positioning portion and a width of the first recessed portion in the first direction is smaller than a difference between a width of the first portion and a width of the second recessed portion in the first direction.

7. The image reading apparatus according to claim 1, wherein the second surface includes a pressing portion configured to abut against the second circuit surface and to press the circuit board so that the first circuit surface is pressed against the first surface.

8. The image reading apparatus according to claim 1, wherein the second surface extends from a lower end of the positioning portion in the second direction.

9. The image reading apparatus according to claim 1, wherein the positioning portion disposed at a position between a first position at which a first light emitting element is disposed and a second position at which a second light emitting element adjacent to the first light emitting element is disposed in the first direction.

10. The image reading apparatus according to claim 1, wherein the circuit board is formed of metal, and the light guide is formed of resin.

11. The image reading apparatus according to claim 1, wherein the light guide includes a third surface facing a third circuit surface of the circuit board which intersects the first direction, and a fourth surface facing the second circuit surface, the third surface adjacent to the first surface and the fourth surface.

12. The image reading apparatus according to claim 11, wherein the third circuit surface is a surface positioning at an end portion of the circuit board in the first direction.

13. The image reading apparatus according to claim 11, wherein the third surface extends in the third direction from the first surface, and wherein the fourth surface extends in the first direction from the third surface.

14. An image forming apparatus comprising:

a plurality of light emitting elements configured to emit light;

a circuit board including a first circuit surface on which the plurality of light emitting elements is arranged in a first direction and a first recessed portion recessed in a second direction intersecting with the first direction in parallel with the first circuit surface;

a light guide configured to guide light, emitted from the plurality of light emitting elements, to a sheet; and an image reading device configured to read an image on the sheet based on light reflected from the sheet;

an image forming unit configured to form image on a sheet based on the image read by the image reading device, wherein the light guide includes a first surface facing the first circuit surface, and a positioning portion provided at a position corresponding to the first recessed portion in the first direction and extending from the first surface in a third direction intersecting with the first direction and the second direction and configured to position the circuit board in the first direction with respect to the light guide member in a state in which the positioning portion enters the first recessed portion, and wherein the light guide includes a second surface facing a second circuit surface of the circuit board opposite to the first circuit surface, and the second surface extends from the positioning portion in the second direction.

* * * * *